United States Patent
Stone et al.

(10) Patent No.: US 7,112,591 B2
(45) Date of Patent: Sep. 26, 2006

(54) COMPOSITION AND METHOD FOR HUMANE EUTHANASIA OF ANIMALS

(75) Inventors: John David Stone, Alpharetta, GA (US); Michael Lee Putnam, Fort Dodge, IA (US); Robert O. Keene, Bozeman, MT (US)

(73) Assignee: Wyeth, Madison, NJ (US)

( * ) Notice: Subject to any disclaimer, the term of this patent is extended or adjusted under 35 U.S.C. 154(b) by 526 days.

(21) Appl. No.: 10/370,152

(22) Filed: Feb. 18, 2003

(65) Prior Publication Data

US 2003/0159659 A1 Aug. 28, 2003

Related U.S. Application Data

(60) Provisional application No. 60/358,467, filed on Feb. 20, 2002.

(51) Int. Cl.
*A61K 31/505* (2006.01)
(52) U.S. Cl. ...................... 514/274; 514/269; 514/311; 514/312
(58) Field of Classification Search ...................... None
See application file for complete search history.

(56) References Cited

OTHER PUBLICATIONS

Richard C. Herschler, et al, "Secobarbital/dibucaine Combination as a Euthanasia Agent for Dogs and Cats," Veterinary Medicine/Small Animal Clinician, pp. 1009-1012, Jul. 1981.
A. Thomas Evans, et al., "Comparison of Pentobarbital Alone and Pentobarbital in Combination with Lidocaine for Euthanasia of Dogs," JAVMA, vol. 203, No. 5, pp. 664-666, Sep. 1, 1993.
"1993 Report of the AVMA Panel on Euthanasia," JAVMA, vol. 202, No. 2, pp. 229-249, Jan. 15, 1993.
M.P. Blaustein, et al., "Action of anionic and cationic nerve-blocking agents," Chemical Abstracts, vol. 65, pp. 9527-9528, 1966.
John C. Krantz, Jr., "Anesthetics," Chemical Abstracts, vol. 64, pp. 19315, 1966.
Veterinary Pharmaceuticals and Biologicals, 10th Edition, pp. 676, 718-720, 1997.

*Primary Examiner*—Dwayne Jones
(74) *Attorney, Agent, or Firm*—Barbara L. Renda

(57) ABSTRACT

A novel euthanasia composition for animals, especially companion animals, utilizes a combination of sodium pentobarbital with dibucaine. The composition is easy to administer, fast-acting and relatively painless. A humane method for euthanasia involves administering the composition to animals for which euthanasia is desired.

43 Claims, No Drawings

COMPOSITION AND METHOD FOR HUMANE EUTHANASIA OF ANIMALS

This application claims priority from provisional application(s) Ser. No. 60/358,467 filed on Feb. 20, 2002.

FIELD OF THE INVENTION

The present invention relates to novel euthanasia formulations for animals, in particular companion animals. The invention also relates to an improved method of euthanatizing animals that is quicker, more efficacious and correspondingly more humane.

BACKGROUND OF THE INVENTION

Veterinarians and other related animal health professionals are continually searching for more expeditious and less intrusive means of euthanatizing animals, especially companion animals such as dogs and cats. The goal is to "put down" the animal as quickly and as painlessly as possible. There is nothing more emotionally unsettling to a caring practitioner or animal owner than watching his or her charge suffer a drawn out and painful induced death.

Many compositions have now been formulated to both euthanatize an animal and anesthetize it during the process as well. For example, compositions containing pentobarbital alone and in combination with lidocaine have been described.[1] In addition, a secobarbital/dibucaine combination has also been researched, but with mixed results.[2] Sodium pentobarbital is typically the more preferred drug of choice over secobarbital, as it is generally recognized as potent, long-acting, stable in solution, and relatively inexpensive.

Unfortunately, problems exist with many of the formulations available today. Some are too slow acting to be considered truly viable, thereby delaying death and producing needless suffering for the animal. Others are difficult to syringe, while still others are painful to the animal upon administration. Still others may cause gasping and gurgling and other unwarranted symptoms. While not painful to the animal, these may be aesthetically and emotionally difficult for veterinary practitioners and pet owners to observe.

Thus, there exists a need in the art for a new euthanasia formulation which is highly effective for all types of animals, and especially companion animals. There is also a need for a new method of euthanatizing an animal which is more humane than those presently utilized in the art.

SUMMARY OF THE INVENTION

In one embodiment, the present invention is directed to a composition suitable for euthanasia of an animal, and comprising on a weight/volume basis from about 5 to about 60% of sodium pentobarbital; and from about 0.1 to about 10% of an anesthetic consisting essentially of dibucaine.

In a further embodiment, there is provided a euthanasia composition suitable for use on a companion animal, comprising about 20 to about 30% of sodium pentobarbital; about 0.5 to about 5% of an anesthetic consisting essentially of dibucaine; one or more solvents; and water.

Further provided is a euthanasia formulation, comprising about 20 to about 30% of sodium pentobarbital; about 0.5 to about 5% of an anesthetic consisting essentially of dibucaine; about 5 to about 10% of a formulation alcohol; about 15 to about 25% of a formulation polyol; and water.

In a still further embodiment of the invention, there is a euthanasia formulation in the form of a solution, comprising about 23 to about 28% w/v of sodium pentobarbital; about 0.5 to about 1.5% w/v of an anesthetic consisting essentially of dibucaine; about 5 to about 10% w/v of isopropyl alcohol; about 15 to about 25% w/v of propylene glycol; and water.

Also provided as part of the present invention is a method of euthanatizing an animal, which comprises administering a composition containing sodium pentobarbital in an amount of about 20 to about 30% by weight/volume and an anesthetic consisting essentially of dibucaine in an amount of from about 0.5 to about 3% by weight/volume.

Another method of the invention is prescribed for humane euthanasia, which comprises administering a composition to a companion animal at a dosage of about 1–2 milliliters up to about 10 pounds of animal weight and 1 milliliter for every 10 pounds thereafter, said composition containing about 23% to about 28% w/v of sodium pentobarbital, about 0.5 to about 1.5% w/v of dibucaine, at least one solvent, and water.

The foregoing and other features and advantages of the invention will become more apparent from the detailed description of the preferred embodiments of the invention given below.

DETAILED DESCRIPTION OF THE PREFERRED EMBODIMENTS

The present invention relates to a novel euthanasia composition and method for animals. Of particular importance are commercial animals, e.g. those that are raised for work or for food production, as well as those that are raised as companion animals or pets for humans. The invention is especially well suited for companion animals. The term "companion animals" or "pets" would therefore include without limitation dogs, cats, horses, rabbits, rodents, birds, weasels, skunks, and even snakes, as well as other types of domesticated creatures, whether caged or not.

A first component of the composition of the invention is sodium pentobarbital, which may be used interchangeably herein with the term "pentobarbital." terms refer to the Drug Enforcement Agency Schedule II narcotic, which is a barbiturate, or derivative of barbituric acid (malonyl urea). Barbiturates in general, and sodium pentobarbital in particular, act by depressing the central nervous system, beginning with the cerebral cortex. Most of them exert a sedative effect in small doses and a hypnotic effect in larger doses. With greater quantities, deep anesthesia progresses to apnea, owing to depression of the respiratory center. This response is followed by cardiac arrest and then death.

Sodium pentobarbital is typically the most preferred of the barbiturates for euthanasia because it is generally viewed as more efficacious than the related compounds of secobarbital, amobarbital, thiopental sodium and thiamylal. Thus, the invention particularly contemplates sodium pentobarbital without the inclusion of other barbiturates.

The quantity of sodium pentobarbital that may be utilized in the composition of the invention is an amount that is considered effective at safely and quickly euthanatizing an animal. The amount may vary, but will typically be within the range of about 5 to about 60% of the composition on a weight/volume or w/v basis (unless otherwise specified, all weight percents herein shall be on a weight/volume basis). In a more preferred embodiment, the quantity of sodium pentobarbital shall be within the range of about 20 to about 30% w/v. Even more preferred is a quantity within the range of about 23 to about 28% w/v.

The invention also utilizes dibucaine as part of the composition. Dibucaine is derived from a group of compounds that are typically utilized as local and topical anesthetics. It has now been discovered that a sodium pentobarbital/dibucaine combination is an especially synergistic combination for the euthanasia of animals, in particular companion animals. Dibucaine is strongly preferred over other local and topical anesthetics. In particular, dibucaine is preferred over the similar compound, lidocaine. Dibucaine and sodium pentobarbital are perhaps more effective at euthanasia than is a similar combination of lidocaine and sodium pentobarbital. Thus, the invention especially prefers that substantially no lidocaine be included in the final formulation.

The quantity of dibucaine as part of the invention will typically be within the range of about 0.1 to about 5% w/v. More preferred is a range of about 0.5 to about 3%. A quantity of about 1 to about 2% may be desirable in many embodiments. Dibucaine may be utilized as a pharmaceutically acceptable salt, for example, dibucaine hydrochloride.

Other components of the euthanasia composition of the invention will include one or more conventional formulation agents. These are utilized to formulate the sodium pentobarbital/dibucaine combination into an acceptable delivery form. A solution is especially preferred because it is considered easier to syringe than are suspensions, emulsions, immersions and other multi-phase systems and the like. Thus, some of these formulation agents may also be referred to herein as solvents.

One or more alcohols can serve as suitable formulation agents because they can act to solvate the active ingredients. Of these, the shorter chain $C_2$–$C_6$ alcohols are preferred. An example of a suitable alcohol is isopropyl alcohol. When one or more alcohols are utilized as formulation agents, their quantity in the final composition will typically be within the range of about 1 to about 15% w/v. More preferred is a range of about 5 to about 10% w/v.

Other compounds can also function as formulation agents and/or solvents. These can include one or more polyols, for example. In particular, glycols are preferred, such as ethylene glycol and propylene glycol. Propylene glycol may be especially suitable in many embodiments. When polyols are utilized, they are usually present in somewhat larger quantities than any alcohol(s) which may also be present. Thus, polyols may be present in amounts within the range of about 10 to about 30% w/v, with about 15 to about 25% w/v being perhaps more preferred. The quantity of formulation agent(s) can vary somewhat, depending upon the needs of the person skilled in the art, as well as the characteristics desired in the final formulation.

In addition to one or more formulation agents, the composition of the invention can also contain one or more other conventional excipients. These excipients may be selected from the non-limiting list of viscosity modifiers, buffers, preservatives, and coloring agents and the like. Quantities may vary, but will typically be within the range of about 0.01 to about 10% w/v. Especially preferred is a trace amount of one or more approved food colors or dyes in amounts effective to impart a noticeable colored tinge to the formulation. Inclusion of a dye will permit the veterinary practitioner to readily identify the composition, so that it is not accidentally misapplied. Blue is a suitable color because of its aesthetically soothing effect upon the eyes during administration.

The remainder of the composition will typically be a liquid such as water in amounts so that the final percentage of all components will be about 100%. As heretofore noted, the composition is preferably in the form of a solution or other state that will allow for facile syringability and delivery. The composition is storage stable for at least about six (6) months, and preferably for up to at least about two (2) years with substantially no breakdown of components or loss of potency of the active ingredients.

The various components of the invention may be admixed together using suitable equipment available in the art. For example, one or more of the formulation agents may be prepared under stirring. The actives may then be added thereto, especially after dissolution in water. The final formulation may then be transferred to any suitably approved container for administration. One or more suitable inert gases, such as nitrogen ($N_2$), can also assist in the formulation process according to procedures available in the art.

The composition of the invention may be utilized to euthanatize animals, and in particular companion animals such as pets. Administration will depend upon the type of animal, as well as its size and weight. Typically, the formulation may be administered at a dosage of about 1–2 milliliters for the first 10 pounds of animal weight, and about 1 milliliter for every additional 10 pounds thereabove. As an example, a dog weighing about 37.5 pounds would necessitate about 4–5 milliliters (~5 mL) of the composition of the invention to be euthanatized effectively.

The composition may be delivered by the most expeditious route of delivery, with injection being most preferred. Thus, the composition may be injected intravenously, intraperitoneally, intrathoracically, or intracardially, for example. The skilled practitioner will seek to maximize the concomitant goals of quick euthanasia with minimal discomfort and suffering.

The following examples will serve to illustrate various preferred aspects of the invention, but should not be construed as limiting the scope thereof:

EXAMPLE 1

A euthanasia composition having the following components was prepared:

TABLE 1

| Component | Concentration |
| --- | --- |
| Sodium Pentobarbital | 260.0 mg/mL |
| Dibucaine (as Dibucaine HCl) | 10.0 mg/mL (11.06 mg/mL) |
| Isopropyl Alcohol | 78.5 mg/mL |
| Propylene Glycol | 207.1 mg/mL |
| FD&C Blue Dye #1 | 30.0 µg/mL |
| Water | QS to 1 mL or 100% |
| Nitrogen, NF* | NA |

*Record Actual Nitrogen

A beaker was tared and then placed on a stir plate with a stir bar. Isopropyl alcohol and propylene glycol were placed in the beaker and stirred for 3⅓ minutes. Sodium pentobarbital was weighed and slowly poured into the beaker with stirring. The mixture became very thick after several minutes, and was then placed on a Lightnin mixer at 600 rpms for 15 minutes. Purified water was put in another beaker with a magnetic stirrer, and dibucaine hydrochloride was dissolved therein with stirring. Dye was then dissolved in the dibucaine hydrochloride solution. One half of the resultant solution was then added to the sodium pentobarbital/isopropyl alcohol/propylene glycol mixture with stirring. After 10 minutes, the remaining dibucaine solution was added and stirred for an additional 5 minutes. The sodium pentobarbital was fully dissolved therein. The final formulation was put into bottles and sealed and labeled.

EXAMPLE 2

For this blind clinical trial, the formulation of the invention from Example 1 (No. 76—Dibucaine 1% Solution) was compared against four other formulations, one of which is currently marketed under the trademark SLEEPAWAY® (No. 73), which contained sodium pentobarbital with no anesthetic (lidocaine or dibucaine). All formulations contained approximately equivalent amounts of sodium pentobarbital with either lidocaine 5% (No. 71), lidocaine 3% (No. 72) or a dibucaine 3% suspension (No. 74). Euthanasia was performed on either healthy dogs or healthy cats, where indicated. A rating of subjective performance measures was given by the veterinary practitioner in the following areas: "syringability", "pain", "smoothness" and "rigidity." The practitioner did not know which formulation was being administered. The dosing (quantity) was the same for each animal, as set forth in the specification. The results are averaged and illustrated in the following Table 2.

TABLE 2

| Animal | Formulation | Number of Dogs | Time to Unconsciousness (Sec) | Time to Breathing Cessation (Sec) | Time to Heartbeat Cessation (Sec) | Performance Measures (1 (Worst)–5 (Best) Rating) | | | |
|---|---|---|---|---|---|---|---|---|---|
| | | | | | | Syringability | Pain | Smoothness | Rigidity |
| Dog | 71 | 10 | 6.40 | 7.40 | 79.50 | 2.90 | 2.70 | 3.10 | 3.00 |
| | 72 | 10 | 5.40 | 8.30 | 104.20 | 3.00 | 3.00 | 3.20 | 3.00 |
| | 73 | 10 | 5.80 | 7.80 | 100.00 | 3.00 | 2.80 | 3.20 | 3.00 |
| | 74 | 9 | 5.56 | 8.67 | 76.67 | 1.22 | 3.00 | 2.89 | 3.00 |
| | 76 | 10 | 5.90 | 7.90 | 61.10 | 3.30 | 3.10 | 3.40 | 2.90 |
| Dog | 71 | 10 | 5.00 | 6.40 | 11.80 | 3.00 | 2.33 | 4.00 | 3.20 |
| | 72 | 10 | 5.38 | 6.90 | 10.40 | 2.20 | 3.13 | 3.25 | 3.20 |
| | 73 | 10 | 4.80 | 7.00 | 11.40 | 2.60 | 2.60 | 3.60 | 3.20 |
| | 74 | 10 | 5.86 | 7.80 | 11.30 | 1.40 | 2.57 | 2.57 | 3.10 |
| | 76 | 10 | 4.83 | 5.60 | 9.00 | 3.10 | 3.00 | 3.17 | 3.50 |

As Table 2 illustrates, Time to Heartbeat Cessation was quickest with the formulation of the invention (No. 76). This formulation allowed the animal to be "put down" (euthanized) faster, and was overall more highly rated than the currently marketed formulation SLEEPAWAY®. Formulation No. 74 was, in general, a fast-acting euthanasia agent, but was overall less favorably rated on the subjective factor of syringability, probably due to the fact that this formulation was a suspension, and not a solution.

EXAMPLE 3

For this example, a comparison was made between the formulation of the invention and the formulation known in the art as "Beuthanasia-D" (390 milligrams of sodium pentobarbital and 50 milligrams of phenytoin sodium). As in Example 2, a rating of subjective performance measures was given by the veterinary practitioner in certain areas, in this case: "syringability", and "limb rigidity." A rating of "1" was considered the worst, while a rating of "5" was considered the best. The dosing (quantity) was the same for each animal, as set forth in the specification. The results are shown in Table 3 below. All cats were anesthetized prior to euthanasia:

TABLE 3

| Cat | Breathing Cessation (sec) | Heartbeat Cessation (sec) | Syringability | Limb Rigidity |
|---|---|---|---|---|
| | | No. 76 | | |
| 1 | 6 | 15 | 4 | 4 |
| 2 | 5 | 40 | 4 | 4 |
| 3 | 4 | 60 | 4 | 3 |
| 4 | 5 | 45 | 4 | 4 |
| 5 | 4 | 28 | 4 | 4 |
| 6 | 5 | 20 | 4 | 3 |
| 7 | 5 | 30 | 4 | 4 |
| 8 | 6 | 40 | 4 | 4 |
| 9 | 5 | 24 | 4 | 4 |
| 10 | 4 | 30 | 4 | 3 |
| 11 | 5 | 45 | 4 | 4 |
| 12 | 4 | 30 | 4 | 4 |
| 13 | 5 | 28 | 4 | 4 |
| 14 | 5 | 40 | 4 | 4 |
| 15 | 6 | 65 | 4 | 3 |
| 16 | 4 | 70 | 4 | 3 |
| 17 | 6 | 22 | 4 | 3 |
| 18 | 5 | 40 | 4 | 4 |
| 19 | 6 | 45 | 4 | 4 |
| 20 | 5 | 65 | 4 | 3 |
| | | Beuthanasia-D | | |
| 1 | 4 | 12 | 4 | 3 |
| 2 | 3 | 11 | 3 | 3 |
| 3 | 4 | 13 | 3 | 4 |
| 4 | 5 | 22 | 3 | 4 |
| 5 | 3 | 8 | 3 | 4 |
| 6 | 4 | 11 | 3 | 4 |
| 7 | 6 | 20 | 3 | 4 |
| 8 | 4 | 11 | 3 | 4 |
| 9 | 6 | 30 | 3 | 4 |
| 10 | 7 | 40 | 3 | 3 |
| 11 | 5 | 18 | 3 | 4 |
| 12 | 5 | 11 | 3 | 4 |
| 13 | 5 | 22 | 3 | 4 |
| 14 | 7 | 30 | 3 | 3 |
| 15 | 7 | 22 | 3 | 4 |
| 16 | 8 | 35 | 3 | 4 |
| 17 | 4 | 60 | 3 | 4 |
| 18 | 5 | 90 | 3 | 3 |

TABLE 3-continued

| Cat | Breathing Cessation (sec) | Heartbeat Cessation (sec) | Syringa-bility | Limb Rigidity |
|---|---|---|---|---|
| 19 | 5 | 90 | 3 | 3 |
| 20 | 6 | 94 | 3 | 3 |

As Table 3 indicates, a veterinary practitioner consistently rated the formulation of the invention as having a higher syringability factor.

Although the invention has been described with reference to particular embodiments thereof, it should be appreciated that many changes and modifications can be made without departing from the spirit or scope of the invention. Accordingly, the invention is not to be considered as limited by the foregoing description, but is only limited by the scope of the appended claims.

BIBLIOGRAPHY

1. Evans et al., "*Comparison of pentobarbital alone and pentobarbital in combination with lidocaine for euthanasia of dogs,*" JAVMA, vol. 203, No. 5, Sep. 1, 1993.
2. Herechler et al., "*Secobarbital/dibucaine combination as a euthanasia agent for dogs and cats,*" Pet Practice, vol. 76, No. 7, July, 1981.

What is claimed is:

1. A composition, suitable for euthanasia of an animal, comprising on a weight/volume basis:
   a) about 5 to about 60% of sodium pentobarbital; and
   b) 1% of an anesthetic consisting essentially of dibucaine; said composition containing no lidocaine.
2. The composition as claimed in claim 1, further comprising one or more formulation agents.
3. The composition as claimed in claim 2, wherein said formulation agent is a solvent.
4. The composition as claimed in claim 3, wherein said formulation agent is at least one member selected from the group consisting of alcohols and polyols.
5. The composition as claimed in claim 4, wherein said alcohol is isopropyl alcohol and said polyol is propylene glycol.
6. The composition as claimed in claim 2, further comprising water.
7. The composition as claimed in claim 1, wherein said composition is a solution.
8. A euthanasia composition suitable for use on a companion animal, comprising:
   a) about 20 to about 30% of a euthanizing agent consisting essentially of sodium pentobarbital;
   b) 1% of an anesthetic consisting essentially of dibucaine;
   c) one or more solvents; and water; wherein said composition contains no lidocaine.
9. The composition of claim 8, wherein said solvent is at least one alcohol.
10. The composition of claim 8, wherein said solvent is at least one polyol.
11. The composition of claim 8, further comprising at least one dye.
12. The composition of claim 9, wherein said alcohol is isopropyl alcohol.
13. The composition of claim 10, wherein said polyol is propylene glycol.
14. A euthanasia formulation, comprising on a weight/volume basis:
   a) about 20 to about 30% of a euthanizing agent consisting essentially of sodium pentobarbital;
   b) 1% of an anesthetic consisting essentially of dibucaine;
   c) about 5 to about 10% of a formulation alcohol;
   d) about 15 to about 25% of a formulation polyol; and
   e) water; wherein said formulation contains no lidocaine.
15. The formulation of claim 14, wherein said sodium pentobarbital is present in an amount of at least about 25%.
16. The formulation of claim 14, wherein said formulation alcohol is isopropyl alcohol.
17. The formulation of claim 16, wherein said formulation alcohol is present in an amount of not greater than about 8%.
18. The formulation of claim 16, wherein said formulation polyol is a glycol.
19. The formulation of claim 18, wherein said glycol is propylene glycol.
20. The formulation of claim 18, wherein said glycol is present in an amount of at least about 20%.
21. The formulation of claim 14, wherein said formulation is syringed with dye.
22. A method of euthanatizing an animal, which comprises administering a composition containing sodium pentobarbital in an amount of about 20 to about 30% by weight/volume and an anesthetic consisting essentially of dibucaine in an amount of 1% by weight/volume.
23. The method of claim 22, wherein said method comprises administering substantially no lidocaine.
24. The method of claim 22, wherein said composition is administered at a dose of about 2 milliliters per up to about 10 pounds of animal weight.
25. The method of claim 24, wherein said composition is administered at a dose of about 1 milliliter for each additional 10 pounds of animal weight.
26. The method of claim 22, wherein said method comprises administering said composition intravenously, intraperitoneally, intrathoracically, or intracardially.
27. The method of claim 22, wherein said method comprises administering a solution of said composition.
28. The method of claim 22, wherein said method is useful on companion animals.
29. The method of claim 28, wherein said companion animals are selected from the group consisting of dogs and cats.
30. The method of claim 26, wherein said composition is administered with a dye.
31. The method of claim 22, wherein said composition is administered with at least one formulation agent.
32. The method of claim 31, wherein said formulation agent is selected from the group consisting of isopropyl alcohol and propylene glycol.
33. A euthanasia formulation, comprising:
   a) about 23 to about 28% w/v of sodium pentobarbital;
   b) 1% w/v of an anesthetic consisting essentially of dibucaine;
   c) about 5 to about 10% w/v of isopropyl alcohol;
   d) about 15 to about 25% w/v of propylene glycol; and water; wherein said formulation contains no lidocaine.
34. The formulation of claim 33, further comprising a dye.
35. The formulation of claim 34, wherein said dye is blue coloring.
36. The formulation of claim 33, wherein said formulation is administered to a companion animal at the rate of about 2 mL per 10 pounds of animal weight.
37. The formulation of claim 36, wherein said formulation is further administered to said animal at a rate of about 1 mL per 10 pounds of additional animal weight.

38. The formulation of claim 33, wherein said formulation is in the form of a solution.

39. The composition of claim 1, wherein said composition is in the form of a solution.

40. The composition of claim 1, wherein said composition is not a suspension.

41. A method for humane euthanasia, which comprises administering a composition to a companion animal at a dosage of about 1–2 milliliters up to about 10 pounds of animal weight and 1 milliliter for every 10 pounds thereabove, said composition containing about 23% to about 28% w/v of sodium pentobarbital, 1% w/v of dibucaine, at least one solvent, and water; said composition containing no lidocaine.

42. The method of claim 41, wherein said composition is administered intravenously.

43. The method of claim 42, wherein said composition is administered intraperitoneally.

* * * * *